United States Patent
Woytowitz

(10) Patent No.: US 6,977,351 B1
(45) Date of Patent: Dec. 20, 2005

(54) MOISTURE ABSORPTIVE RAIN SENSOR WITH SEALED POSITION SENSING ELEMENT FOR IRRIGATION WATERING PROGRAM INTERRUPT

(75) Inventor: Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 10/977,918

(22) Filed: Oct. 29, 2004

(51) Int. Cl.[7] ............................................. H01H 35/00
(52) U.S. Cl. ............................... 200/61.04; 200/61.06; 200/61.07
(58) Field of Search ..... 73/73, 170.17; 137/78.1–78.5; 200/61.04, 61.05, 61.06, 61.07; 239/63–67; 340/603, 604

(56) References Cited

U.S. PATENT DOCUMENTS

| | | | |
|---|---|---|---|
| 2,688,056 A | * | 8/1954 | Kettering et al. ........ 200/61.06 |
| 3,808,385 A | | 4/1974 | Klinefelter ............... 200/61.04 |
| 4,313,042 A | * | 1/1982 | Ehrhart .................... 200/61.04 |
| 4,655,076 A | * | 4/1987 | Weihe et al. .................. 73/73 |
| 4,862,701 A | * | 9/1989 | Small et al. .................. 62/150 |
| 5,101,083 A | * | 3/1992 | Tyler et al. .............. 200/61.04 |
| 5,836,339 A | | 11/1998 | Klever et al. .............. 137/78.2 |
| 6,088,621 A | | 7/2000 | Woytowitz et al. ........... 700/16 |
| 6,401,530 B1 | * | 6/2002 | Gianfranco. ............. 73/170.21 |
| 6,452,499 B1 | | 9/2002 | Runge et al. ............... 340/601 |
| 6,570,109 B2 | | 5/2003 | Klinefelter et al. ...... 200/61.04 |

* cited by examiner

Primary Examiner—Michael A. Friedhofer
(74) Attorney, Agent, or Firm—Michael H. Jester

(57) ABSTRACT

A rain sensor for use with an irrigation control system includes a position sensing element. A moisture absorptive element is supported for receiving rainfall. An actuating element is mechanically connected to the moisture absorptive element for movement adjacent the position sensing element as the moisture absorptive element expands and contracts to thereby induce a change in the position sensing element that can be used to generate an interrupt signal without any mechanical connection between the moisture absorptive element and the position sensing element.

9 Claims, 2 Drawing Sheets

MOISTURE ABSORPTIVE RAIN SENSOR WITH SEALED POSITION SENSING ELEMENT FOR IRRIGATION WATERING PROGRAM INTERRUPT

BACKGROUND OF THE INVENTION

The present invention relates to irrigation systems, and more particularly, to rain sensors which interrupt the execution of a watering program by an electronic irrigation controller during periods of rainfall.

In many areas of the world, it is necessary to irrigate crops and landscaping due to inadequate seasonal rainfall. Within the past several decades electronically controlled irrigation systems have come into widespread use. They typically include a micro-processor based irrigation controller which executes a stored watering program for turning on and off valves connected to supply lines equipped with sprinklers. The watering program typically activates various zones during run cycles measured in minutes on selected days of the week. The watering program can be adjusted to accommodate seasonal variations in rainfall. However, due to the unpredictability of weather patterns in general, it is desirable to connect a rain or moisture sensor to an electronic irrigation controller so that the sprinklers will not be turned on while it is raining, and for some time period thereafter before the rainfall has either evaporated or soaked into the ground. By interrupting a watering program of an electronic irrigation controller during, and shortly after, a period of rainfall, both purified and reclaimed water can be conserved thus lessening the demand on purification plants, reservoirs and other artificial delivery systems.

Rain sensors and moisture responsive actuators have been developed for use in connection with electronic irrigation controllers. One type of rain sensor operates in response to the weight of rainfall collected in a receptacle. However, this type of rain sensor is adversely affected by wind conditions and the collection of debris, and is too slow in reactivating the watering program. Its evaporative rate is not adjustable. Subterranean moisture sensors have also been developed for use with irrigation controllers. However, they are expensive, unreliable and subject to breakdowns. Rainfall sensors have also been developed which utilize infrared emitter and detector devices that optically detect the presence of collected rainfall. See for example U.S. Pat. No. 5,836,339 of Klever et al. entitled RAINDROP COUNTER AND CONTROL SYSTEM FOR IRRIGATION CONTROL SYSTEMS. However, these devices are relatively complex and expensive. Another category of rain sensor which has been widely commercialized under the MINI-CLIK® trademark utilizes a plurality of stacked discs made of a hygroscopic material. The discs expand in response to contact with rain water to depress a spring biased switch to deactivate the watering program of the electronic irrigation controller. When the rain stops, the hygroscopic discs eventually dry out and contract, thereby releasing the switch to re-activate the watering program. See for example U.S. Pat. No. 3,808,385 of Klinefelter entitled MOISTURE RESPONSIVE SWITCH ACTUATOR.

A principal drawback of rain sensors that utilize hygroscopic material lies in the fact that they require that an electrical switch be connected mechanically to the hygroscopic material. This allows the physical expansion of the hygroscopic material during rain fall, and subsequent contraction of the hygroscopic material during sunny conditions, to actuate the electrical switch between OFF and ON states to thereby generate the watering program interrupt and resume signals. The required mechanical connection between the electrical switch and the hygroscopic material necessarily entails some sort of elastomeric seal, boot or other waterproof flexible interface between an actuating element, such as a lever or pushbutton and a watertight case enclosing the movable conductive contacts of the electrical switch. Over time this elastomeric interface degrades, eventually allowing moisture to enter the watertight case. This leads to corrosion and other failures associated with the movable conductive contacts of the electrical switch. As a result, the irrigation controller may end up commanding the stations of the irrigation system to water during rainfall and/or fail to resume watering after it has been several days since rainfall and watering is required to prevent turf from browning and plants from dying. Thus there is a need for an improved rain sensor that will overcome the shortcomings of the interrupt system disclosed in U.S. Pat. No. 6,452,499 granted to Runge et al. on Sep. 17, 2002 entitled WIRELESS ENVIRONMENTAL SENSOR SYSTEM. The system of Runge et al. employs a rain sensor requiring an electrical switch connected mechanically to the hygroscopic material.

SUMMARY OF THE INVENTION

It is therefore the primary object of the present invention to provide an improved, low-cost, reliable rain sensor for use with irrigation controllers for temporarily interrupting its watering programs.

In accordance with the present invention a rain sensor for use with an irrigation control system includes a position sensing element. A moisture absorptive element is supported for receiving rainfall. An actuating element is mechanically connected to the moisture absorptive element for movement adjacent the position sensing element as the moisture absorptive element expands and contracts to thereby induce a change in the position sensing element that can be used to generate an interrupt signal without any mechanical connection between the moisture absorptive element and the position sensing element.

DETAILED DESCRIPTION

Figure 1:
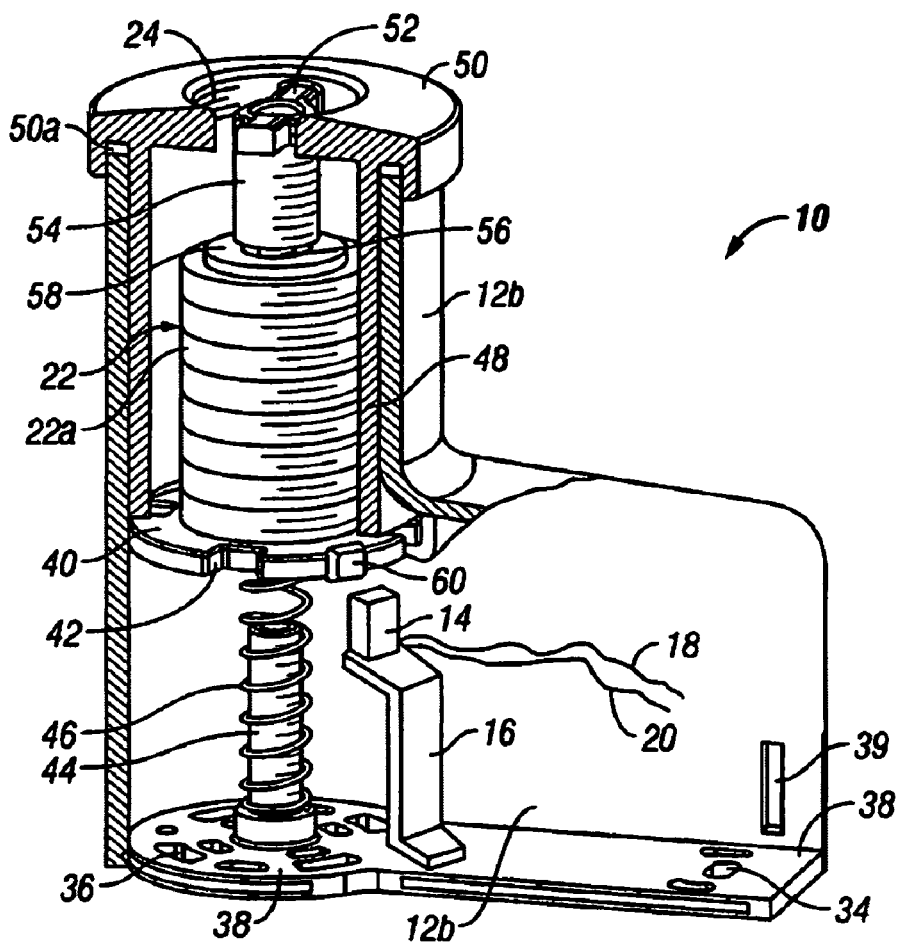
FIG. 1 is a fragmentary vertical sectional view of a rain sensor in accordance with an embodiment of the present invention.

Referring to FIG. 1 a rain sensor 10 for use with a conventional irrigation control system includes a housing 12 and a sealed electrical switch 14 mounted within the housing 12. The switch 14 is preferably a reed switch with a pair of hair-like metal fingers that are pulled together in the presence of a magnetic field. The switch 14 is mounted on a support 16 within the housing 12 and has a pair of leads 18 and 20 for direct connection to an irrigation controller or for connection to an RF transmitter. A moisture absorptive element in the form of a stack 22 of eight individual hygroscopic discs 22a is mounted in the housing 12 for receiving rainfall through an opening 24 in an upper side of the housing 12 for axially expanding (vertically in FIG. 1).

The plurality of hygroscopic discs 22a that make up the stack 22 are washer-shaped and are made of the same hygroscopic material. A material that is a mixture of untreated wood fibers compressed together to form what looks like brown cardboard has been found to have the correct water absorption, expansion and contraction properties, as well as durability. One suitable commercially available material is Kraft Press Board, refined from one-hundred percent pure cellulose pulp.

The housing 12 (FIG. 1) is preferably made of injection molded plastic and includes a hollow rectangular portion 12a that can enclose an additional switch and second moisture absorptive element (not illustrated in FIG. 1). The housing 12 also includes a taller cylindrical portion 12b that encloses the stack 22 of hygroscopic discs 22a. The hollow interior of the rectangular portion 12a of the housing 12 communicates with the hollow interior of the cylindrical portion 12b of the housing 12. The cylindrical housing portion 12b is formed with a plurality of vertical slots 32 on opposite sides thereof. The slots 26 and 32 facilitate ventilation to allow the hygroscopic discs 22a to dry out once the rainfall has ceased. Holes 34 and 36 formed in the bottom wall 38 of the housing 12 allow rainfall that has entered the hole 24 and has not been absorbed by the hygroscopic discs 22a to flow out of the housing 12. The housing portions 12a and 12b are preferably integrally formed and snap onto the bottom wall 38 to facilitate opening the rain sensor 10 to repair or replace its internal parts.

A pair of vertical slots 39 are formed in opposite side walls of the rectangular housing portion 12a for facilitating attachment to a pivoting mounting extension bracket (not illustrated). This facilitates mounting the rain sensor 10 in the outdoors, to an exterior structure, such as the outside wall of a garage or a fence. The rain sensor 10 is preferably mounted close to the irrigation controller so that only a short length of double stranded wire need be used to make the required electrical connection between the leads 18 and 20 and the circuitry of the controller or an RF transmitter.

The stack 22 of hygroscopic disks 22a is supported by a circular platform 40 with four equally spaced notches 42 formed in the periphery thereof to allow for drainage of excess rainfall. A vertical guide stop 44 extends upwardly from the bottom wall 38 in the center of the cylindrical portion 12b of the housing 12. A coil spring 46 surrounds the vertical guide stop 44 and is compressed between the bottom wall 38 and the circular platform 40 to bias the stack 22 of hygroscopic discs 22a upwardly to a return position. An inner cylindrical mounting sleeve 48 snugly and slidingly fits within the upper portion of the cylindrical portion 12b of the housing 12. A circular knob 50 is integrally molded to, and extends across the upper end of, the cylindrical mounting sleeve 48. The knob 50 is formed with a downwardly opening annular groove 50a for receiving the upper end of the housing portion 12b. The mounting sleeve 48 preferably has cut away regions that allow the knob 50 to be rotated to vary the number of the vertical slots 32 that are covered. This permits the user to select quicker or longer dry-out times.

The circular opening 24 is formed in the knob 50 and allows rainfall to enter the cylindrical housing portion 12b and be absorbed by the stack 22 of hygroscopic discs 22a. The hygroscopic discs 22a are formed like washers, i.e. they each have a center hole. A cross-piece 52 extends diametrically across the circular opening 24. A centrally located cylindrical guide piece 54 extends downwardly from the cross-piece 52 and receives the upper end of a cylindrical mounting rod 56. The upper end of the mounting rod 56 may have male threads so that it can be screwed into female threads formed in a downwardly opening vertical bore (not visible) in the guide piece 54. A washer 58 is first installed over the mounting rod 56 before the washer shaped hygroscopic discs 22a are installed over the rod 56 to form the stack 22. The circular platform 40 pushes the disc stack 22 and the washer 58 against the guide piece 54.

A permanent magnet 60 is secured via suitable means (not illustrated) such as adhesive to the circular platform 40 so that it will travel closely adjacent to the reed switch 14 as the hydroscopic discs 22a expand and contract. Thus the permanent magnet 60 provides an actuating element that is mechanically connected to the moisture absorptive element 22 for movement therewith. The magnetic field from the permanent magnet 60 causes the metal fingers of the reed switch 14 to close when the magnet 60 moves downwardly so that it is substantially adjacent to, and opposing, the reed switch 14. At this time, there is still a slight air gap between the permanent magnet 60 and the reed switch 14. It is important to note, however, that the reed switch 14 is isolated from the moving parts of the rain sensor 10 in that there is no mechanical connection or linkage between the hygroscopic discs 22a and the reed switch 14. The reed switch 14 is completely sealed from entry of any moisture as there is no need to have any pivoting mechanical arm or pushbutton extend through an elastomeric interface as is the case when micro-switches and other mechanically actuated switches are used in rain sensors of that employ hygroscopic elements. The reed switch 14 could also be encapsulated in epoxy or other suitable potting material (not illustrated) or an additional rigid sealed watertight enclosure (not illustrated) to further protect against moisture induced failures. Other types of sealed position sensing elements could be used in place of the reed switch 14 such as a Hall effect sensor, capacitive proximity sensor, optical sensor and inductive sensor, in which case the magnet 60 would be replaced with a suitable corresponding actuating element that can induce a change in the position sensing element that can be used to generate an interrupt signal without any mechanical connection between the moisture absorptive element and the position sensing element.

Figure 2:
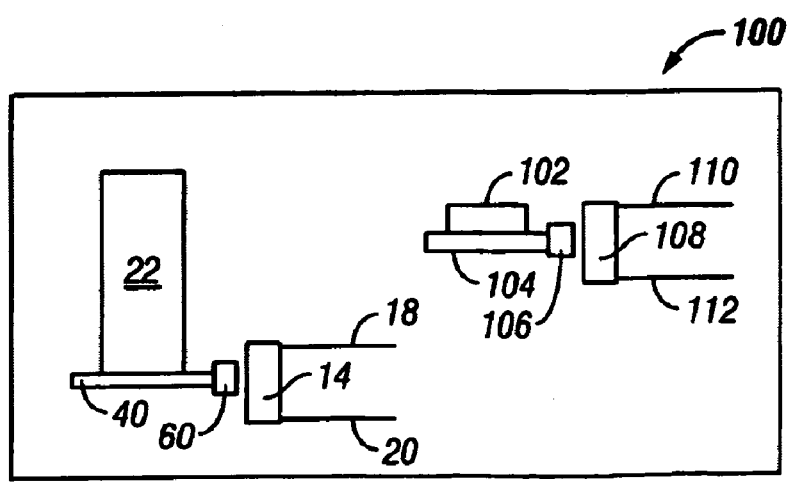
FIG. 2 is a block diagram of an alternate embodiment of the rain sensor that has an extended range.

FIG. 2 is a block diagram of an alternate embodiment 100 of a rain sensor in accordance with the present invention that has an extended range. It is a modification of the rain sensor disclosed in U.S. Pat. No. 6,570,109 granted May 27, 2003 to Klinefelter et al. entitled QUICK SHUT-OFF EXTENDED RANGE HYGROSCOPIC RAIN SENSOR FOR IRRIGATION SYSTEMS and assigned to Hunter Industries, Inc., of San Marcos, Calif., the assignee of the present application. The entire disclosure of the aforementioned U.S. Pat. No. 6,570,109 is hereby incorporated by reference. A second moisture absorptive element 102 comprising a single hygroscopic disc is carried on a dish 104 that carries a second actuating element 106. When the second moisture absorptive element 102 expands due to the absorption of rainfall, it rapidly expands and moves the actuating element 106 into sufficiently close proximity to cause a second sealed electrical switch 108 to be actuated from a first state to a second state. When the second moisture absorptive element 102 dries out and contracts, the actuating element moves back out of proximity with the second sealed electrical switch 108 and the electrical switch 108 is actuated from its second state to its first state. Thus interrupt and resume signals are transmitted on leads 110 and 112 from the sealed electrical switch 108.

When rain commences the second moisture absorptive element 102, comprising only a single hygroscopic disc, rapidly expands. Thereafter the first moisture absorptive element in the form of the stack 22 of eight individual hygroscopic discs 22a (FIG. 1) swells more slowly and eventually actuates the first sealed switch 14. Conversely, when the weather turns dry, the second moisture absorptive element 102 rapidly contracts, however, the much larger first moisture absorptive element consisting of the stack 22 of hygroscopic discs dries out much more slowly. The irrigation controller can accept signals from both of the sealed switches 14 and 108 and preprogramming allows the same to ensure that watering is interrupted as soon as the second switch 108 closes but does not resume until the first switch 14 opens. The housing 114 of the rain sensor 100 can be constructed to allow mechanical adjustment of the minimum amount of water required to maintain the OFF status of watering as described in conjunction with FIGS. 3 and 4 of the aforementioned U.S. Pat. No. 6,570,109.

Thus the rain sensor 100 can provide a quick turn OFF feature since only the single hygroscopic disc needs to absorb a relatively small amount of rainfall to expand sufficiently to change the state of the switch 108. It may be desirable to amplify the physical movement of the single hygroscopic disc with a lever (not illustrated) so that it can be effectively moved into and out of actuating proximity with the second switch 108. The second moisture absorptive element 102 preferably should be able to actuate the second switch 108 during the first five to ten minutes of a rain storm. On the other hand, as more and more rain falls during the storm, the stack 22 of eight hygroscopic discs 22a will eventually absorb enough rainfall, e.g. over a two to four hour time period, to actuate and maintain the switch 14 in its OFF state, even after the single hygroscopic disc has dried out and contracted to the point no longer maintains the switch 108 in its OFF state. Thus rain sensor 100 utilizes the different water absorption capacities of the first and second water absorptive elements to achieve an extended range. It is embarrassing, wasteful and costly to have an automatic irrigation system that is watering turf and vegetation during a rain storm.

When appropriately connected to an electronic irrigation controller, the rain sensors 10 and 100 rapidly shut off watering as soon as a rain storm commences. The rain sensors 10 and 100 also keep the sprinklers from watering not only while it continues to rain, but after the rain has ceased for a time period sufficient so that watering does not re-commence until the rainfall around the vegetation has largely dissipated through evaporation or otherwise. In other words, appropriately adjusted, the rain sensors 10 and 100 keep the irrigation controller from watering until the lawn and soil surrounding the landscape vegetation has dried out, but not so long that the lawn gets brown spots or plants begin to wilt or die.

The hygroscopic discs absorb water and expand proportionally to the amount of rain that falls. For example, a small cloudburst would result in little absorption, and a thunderstorm with two inches of rainfall would lead to much more absorption and expansion. Of course, dry-out time for the stack 22 depends upon the relative temperatures, humidity and wind conditions. However, this is beneficial since there is a direct correlation between dry-out time and the need to re-commence watering to avoid damage to the turf or other landscaping due to insufficient ground water. If only the single hygroscopic disc 18 were utilized, the irrigation controller would allow watering to re-commence way too soon. If only the stack 22 of hygroscopic discs were utilized, it may take too much rain and/or too long before watering were interrupted The rain sensors 10 and 100 represent a significant improvement over the hygroscopic rain sensors disclosed in the aforementioned U.S. Pat. No. 3,808,385 of Glenn B. Klinefelter, U.S. Pat. No. 6,570,109 of Paul A. Klinefelter et al., and U.S. Pat. No. 6,452,499 of Runge et al. The utilization of sealed position sensing elements that do not require any mechanical connection to the hygroscopic discs eliminates the need for any elastomeric interface on the switch and its attendant failures.

Figure 3:
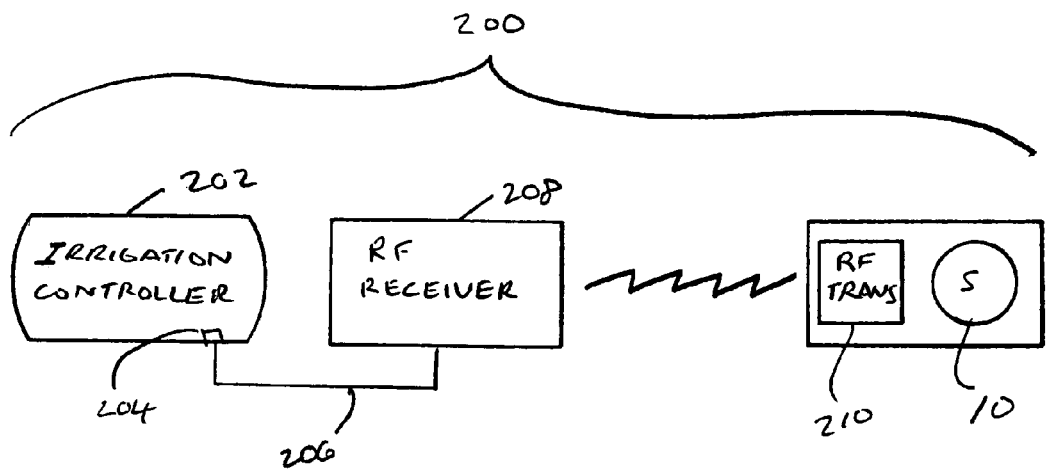
FIG. 3 is a block diagram of an irrigation system incorporating the rain sensor of FIG. 1 in which the interrupt and resume signals are wirelessly transmitted.

FIG. 3 is a block diagram of an irrigation system 200 incorporating the rain sensor 10 of FIG. 1 in which the interrupt and resume signals are wirelessly transmitted. An irrigation controller 202 having a sensor input port 204 receives a male plug from a wiring harness 206 connected to an RF receiver 208 mounted on the same garage wall as the controller 202. The rain sensor 10 is connected to a remote RF transmitter 210 that can be powered by battery, AC source, solar source, wind power, etc. Interrupt and resume signals are transmitted wirelessly to the RF receiver 208 which communicates with the irrigation controller 202 to affect its watering program. The irrigation controller 202 may be an SRC, Pro-C or ICC controller with the SMART-PORT (Registered Trademark) feature, such controllers being commercially available from Hunter Industries, Inc. These controllers are programmable via the SMARTPORT feature and are more fully described in U.S. Pat. No. 6,088,621 granted Jul. 11, 2000 to Peter J. Woytowitz et al., the entire disclosure of which is hereby incorporated by reference. The aforementioned patent is also assigned to Hunter Industries, Inc. The RF receiver 208 and the RF transmitter 210 may be a Wireless RAIN CLIK product also commercially available from Hunter Industries, Inc. with the rain sensor 10 of the present invention substituted into the same. Additional environmental sensors (not illustrated) such a temperature, humidity, wind speed, solar radiation, etc. may be operatively connected to the RF transmitter 210.

While I have described preferred embodiments of my rain sensor, it will be apparent to those skilled in the art that my invention can be modified in both arrangement and detail. For example, in existing hygroscopic rain sensors the electrical switch is normally closed. The reed switch 14 is normally open. Therefore, a mechanical see-saw can be used so that the stack 22 of discs pushes on one end of the see-saw and the other end of the see-saw carries the magnet 60. The magnet 60 will then move away from the reed switch 14 when it rains. This removes any compatibility issues with existing irrigation controllers. Therefore the protection afforded my invention should only be limited in accordance with the scope of the following claims:

What is claimed is:

1. A rain sensor for use with an irrigation control system, comprising:
   a switch actuable between first and second states;
   a moisture absorptive element;
   means for supporting the moisture absorptive element to allow it to expand and contract based on the presence and absence of rain fall; and
   an actuating element mechanically connected to the moisture absorptive element for movement adjacent the switch as the moisture absorptive element expands and contracts to thereby actuate the switch between the first and second states to generate an interrupt signal without any mechanical connection between the moisture absorptive element and the switch.

2. The rain sensor of claim 1 and further comprising means for pre-selecting a position of the moisture absorptive element relative to the switch.

3. The rain sensor of claim 1 wherein the moisture absorptive element is made of a hygroscopic material.

4. The rain sensor of claim 1 wherein the moisture absorptive element is mounted inside a housing.

5. The rain sensor of claim 4 wherein the housing is has a movable portion for selectively covering at least one vent hole in the housing to vary the drying time of the moisture absorptive element.

6. The rain sensor of claim 4 wherein the housing includes a sleeve rotatable to pre-select a position of the moisture absorptive element.

7. The rain sensor of claim 1 wherein the moisture absorptive element is a stack of a plurality of discs each made of a hygroscopic material.

8. The rain sensor of claim 1 and further comprising a spring for biasing the moisture absorptive element to a return position.

9. The rain sensor of claim 1 wherein the switch is a reed switch and the actuating element is a permanent magnet.

* * * * *